United States Patent
Himmelmann

(10) Patent No.: US 10,738,697 B2
(45) Date of Patent: Aug. 11, 2020

(54) PARALLEL COMBUSTOR CONFIGURATION FOR UNMANNED UNDERWATER VEHICLE PROPULSION TURBINE

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 624 days.

(21) Appl. No.: 15/631,128

(22) Filed: Jun. 23, 2017

(65) Prior Publication Data

US 2018/0371994 A1    Dec. 27, 2018

(51) Int. Cl.
| | | |
|---|---|---|
| *F02C 6/20* | (2006.01) | |
| *F02C 3/14* | (2006.01) | |
| *F02C 3/20* | (2006.01) | |
| *F02C 9/26* | (2006.01) | |
| *B63G 8/12* | (2006.01) | |
| *F02C 7/22* | (2006.01) | |

(Continued)

(52) U.S. Cl.
CPC ............... *F02C 6/203* (2013.01); *B63G 8/12* (2013.01); *F02C 3/14* (2013.01); *F02C 3/20* (2013.01); *F02C 7/228* (2013.01); *F02C 9/26* (2013.01); *F42B 19/22* (2013.01); *F05D 2220/32* (2013.01); *F05D 2240/35* (2013.01)

(58) Field of Classification Search
CPC . B63G 8/00; B63G 8/001; B63G 8/08; B63G 8/12; B63G 8/14; B63G 8/16; B63G 8/20; B63G 8/22; F02C 6/203; F02C 7/228; F02C 3/14; F02C 3/20; F02C 9/26; F02C 9/00; F02C 9/50; F02D 9/02
USPC .......... 114/312, 330, 337; 440/38; 60/39.24, 60/39.27, 322, 336, 354
See application file for complete search history.

(56) References Cited

U.S. PATENT DOCUMENTS

| | | | | |
|---|---|---|---|---|
| 3,886,729 A | * | 6/1975 | Amann | F02C 7/36 60/39.24 |
| 3,919,838 A | * | 11/1975 | Armstrong | F02C 3/10 60/39.27 |
| 4,527,514 A | | 7/1985 | Niggemann | |

(Continued)

FOREIGN PATENT DOCUMENTS

| | | |
|---|---|---|
| CN | 104696988 | 6/2015 |
| EP | 2733424 | 5/2014 |
| GB | 2529402 | 2/2016 |

OTHER PUBLICATIONS

Peters, Jonathan A., Summary of Recent Hybrid Torpedo Powerplant Studies, Technical Report No. 07-004, Dec. 2007, Applied Research Laboratory.

(Continued)

*Primary Examiner* — Lars A Olson
(74) *Attorney, Agent, or Firm* — Carlson, Gaskey & Olds, P.C.

(57) ABSTRACT

A propulsion system for an unmanned underwater vehicle includes at least one fuel storage tank. A plurality of combustors is connected to the at least one fuel storage tank. Each of the combustors is connected to a turbine via a corresponding nozzle. An output shaft is connected to the turbine and configured to output rotational energy from the turbine.

20 Claims, 3 Drawing Sheets

(51) Int. Cl.
*F42B 19/22* (2006.01)
*F02C 7/228* (2006.01)

(56) References Cited

U.S. PATENT DOCUMENTS

| | | | | |
|---|---|---|---|---|
| 4,815,294 | A * | 3/1989 | David | F02C 6/16 |
| | | | | 60/595 |
| 5,131,223 | A | 7/1992 | Owen | |
| 5,497,615 | A * | 3/1996 | Noe | F02C 6/20 |
| | | | | 60/39.511 |
| 7,077,072 | B2 * | 7/2006 | Wingett | B63B 22/18 |
| | | | | 114/312 |
| 8,307,661 | B2 | 11/2012 | Harris et al. | |
| 10,414,477 | B2 * | 9/2019 | Himmelmann | B63G 8/001 |
| 2005/0223711 | A1 | 10/2005 | Goldmeer et al. | |
| 2015/0059348 | A1 | 3/2015 | Toronto et al. | |
| 2015/0211445 | A1 | 7/2015 | Kurth et al. | |

OTHER PUBLICATIONS

European Search Report for Application No. 18179270.6 dated Nov. 5, 2018.

* cited by examiner

PARALLEL COMBUSTOR CONFIGURATION FOR UNMANNED UNDERWATER VEHICLE PROPULSION TURBINE

TECHNICAL FIELD

The present disclosure relates generally to a torpedo propulsion turbine, and specifically toward a gas powered turbine having multiple combustors for utilization in a torpedo propulsion system.

BACKGROUND

Unmanned underwater vehicles, such as torpedoes, can be deployed from submarines, aircraft, ships, or any similar deployment platform. Once deployed, the unmanned underwater vehicle is propelled towards a target. Historically, unmanned underwater vehicles have been propelled by many different power sources included liquid fuel (such as Otto Fuel) engines, electric motors and batteries, electric motors and fuel cells, chemically heated steam engines, compressed gas engines, and solid rocket motors.

Maximizing an effective range, while also maintaining a sprint speed (maximum high speed) capability, is one goal of unmanned underwater vehicle design, and is impacted by the type of power source utilized to achieve propulsion. The longer the unmanned underwater vehicle's range, the further the deployment platform can be from the target of the unmanned underwater vehicle, protecting the safety of the deployment platform. In addition to the range, a high sprint speed allows the unmanned underwater vehicle to overtake a moving target once the moving target has been alerted to the unmanned underwater vehicle's presence. As is appreciated in the art, most engine configurations trade off effective range for a higher sprint speed, or sprint speed for a higher effective range.

SUMMARY OF THE INVENTION

In one exemplary embodiment a propulsion system for an unmanned underwater vehicle includes at least one fuel storage tank, a plurality of combustors connected to the at least one fuel storage tank, each of the combustors being connected to a turbine via a corresponding nozzle, and an output shaft connected to the turbine and configured to output rotational energy.

Another example of the above described propulsion system for an unmanned underwater vehicle further includes a propulsor connected to the output shaft via a geared connection.

In another example of any of the above described propulsion systems for an unmanned under underwater vehicle each combustor in the plurality of combustors is the same size as each other combustor in the plurality of combustors.

In another example of any of the above described propulsion systems for an unmanned under underwater vehicle at least one combustor in the plurality of combustors is larger than each other combustor in the plurality of combustors.

Another example of any of the above described propulsion systems for an unmanned under underwater vehicle further includes a controller controllably coupled to each combustor in the plurality of combustors and configured to control a flow of fuel from the at least one fuel storage tank to each combustor.

In another example of any of the above described propulsion systems for an unmanned under underwater vehicle the controller is a dedicated propulsion system controller.

In another example of any of the above described propulsion systems for an unmanned under underwater vehicle the controller is a general systems controller.

In another example of any of the above described propulsion systems for an unmanned under underwater vehicle the turbine is a partial admission axial flow turbine.

In another example of any of the above described propulsion systems for an unmanned under underwater vehicle the nozzles are distributed evenly about a circumference of a turbine inlet.

In another example of any of the above described propulsion systems for an unmanned under underwater vehicle each of the combustors is individually sized to a corresponding propulsion system operational mode.

In another example of any of the above described propulsion systems for an unmanned under underwater vehicle each of the combustors is sequentially sized to at least one corresponding propulsion system operational mode.

In another example of any of the above described propulsion systems for an unmanned under underwater vehicle the propulsion system is disposed in a torpedo. In one exemplary embodiment an unmanned underwater vehicle includes a body housing at least a first fuel storage tank, a general controller, and a propulsion system, and the propulsion system including a gas powered turbine engine mechanically connected to a propulsor, wherein the gas powered turbine engine includes a plurality of parallel combustors.

Another example of the above described unmanned underwater vehicle further includes a second fuel storage tank.

In another example of any of the above descried unmanned underwater vehicles the plurality of parallel combustors are sequentially sized.

In another example of any of the above descried unmanned underwater vehicles the plurality of parallel combustors are individually sized.

In another example of any of the above descried unmanned underwater vehicles each combustor in the plurality of parallel combustors is connected to a single turbine via one of a plurality of supersonic nozzles.

In another example of any of the above descried unmanned underwater vehicles the supersonic nozzles are distributed evenly about a first end of the turbine.

In another example of any of the above descried unmanned underwater vehicles a mechanical connection between the gas powered turbine engine and the propulsor includes an output stage and a geared connection.

An exemplary method of driving a propulsion system for an unmanned underwater vehicle, includes generating combustion products in a single combustor and expanding the combustion products across a turbine in a first propulsion mode, and generating combustion products in at least two combustors and simultaneously expanding the combustion products across the turbine in a second propulsion mode.

These and other features of the present invention can be best understood from the following specification and drawings, the following of which is a brief description.

DETAILED DESCRIPTION OF AN EMBODIMENT

Figure 1:
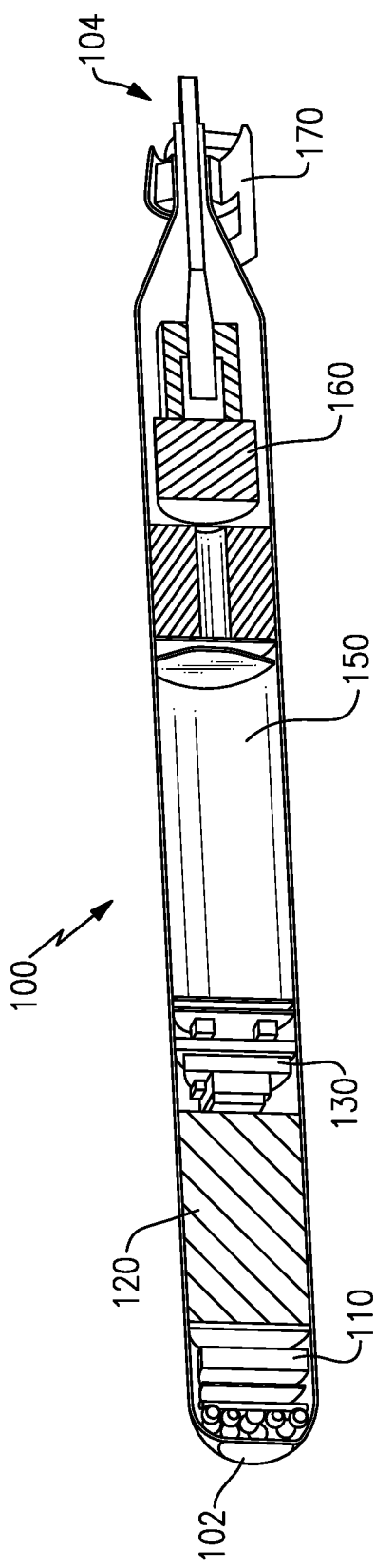
FIG. 1 illustrates a high level schematic view of an exemplary torpedo including a propulsion system.

FIG. 1 schematically illustrates a cross sectional view of an exemplary unmanned underwater vehicle 100. A forward end 102 of the unmanned underwater vehicle 100 includes a navigation system 110, a payload 120, such as a warhead, and control electronics 130. A mid-section of the unmanned underwater vehicle 100 includes fuel storage tank 150. Alternative example unmanned underwater vehicles utilizing multiple fuel types can include two or more distinct fuel storage tanks, each corresponding to its own fuel type. A rear end 104 of the unmanned underwater vehicle 100 includes a gas turbine engine 160 and a propulsor 170.

Figure 2:
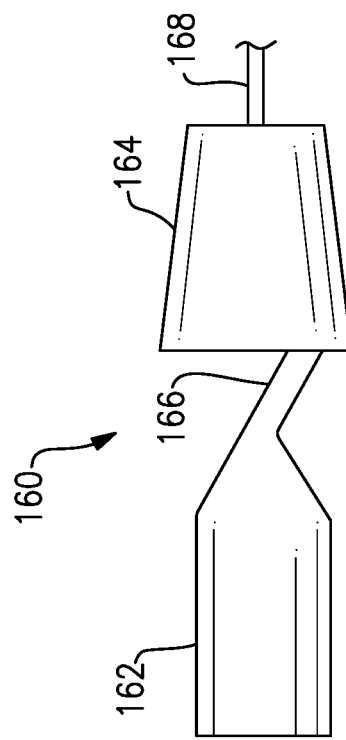
FIG. 2 schematically illustrates an exemplary gas powered turbine for utilization in the torpedo of FIG. 1.

With continued reference to FIG. 1, and with like numerals indicating like elements, FIG. 2 schematically illustrates an exemplary gas turbine engine 160, such as could be utilized in the unmanned underwater vehicle 100 of FIG. 1. The gas turbine engine 160 includes a combustor 162 connected to a partial admission axial turbine 164 via a supersonic nozzle 166. Rotational motion generated by the partial admission axial turbine 164 is output via an output shaft 168. In some examples, the output shaft 168 is directly connected to the propulsor 170 (illustrated in FIG. 1), and directly drives rotation of the propulsor 170. In alternative configurations, the output shaft 168 is connected to the propulsor 170 via a geared connection. In the alternative configuration, the geared connection allows a controller, such as the control electronics 130, to adjust the speed at which the propulsor 170 is rotated, thereby controlling the speed of the unmanned underwater vehicle 100. In yet further alternative examples, the output shaft 168 can be connected to alternative systems, such as electrical generators, in addition to or instead of directly to the propulsor 170.

Figure 3:
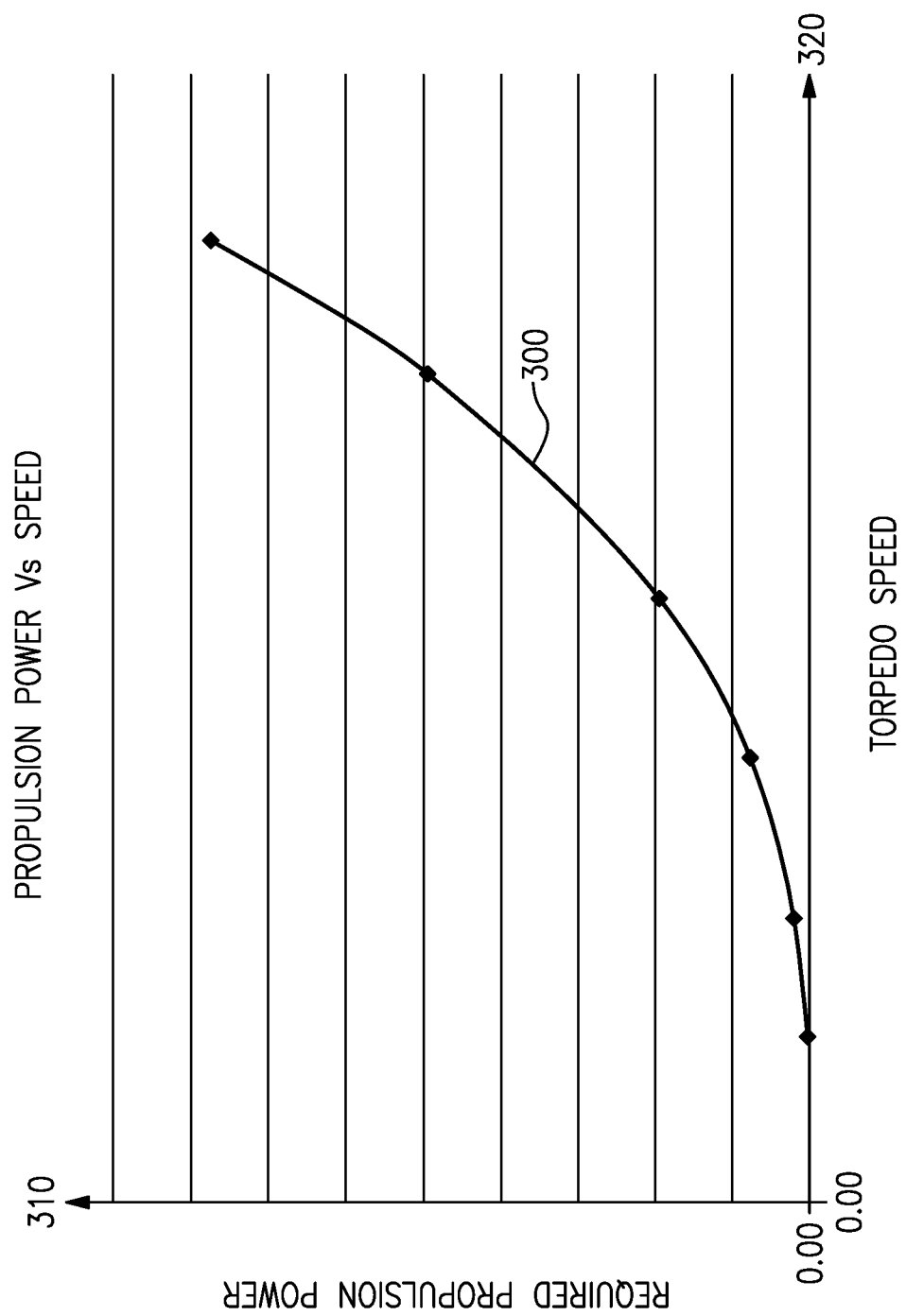
FIG. 3 illustrates a propulsion power vs. speed chart of an exemplary torpedo.

Once launched, the turbine engine 160 converts chemical energy from the fuel in the fuel storage tank 150 into mechanical energy by combusting the fuel in a combustor 162 to produce high temperature gas, referred to as a combustion product. The combustion product is expelled through the supersonic nozzle 166 into the partial admission axial turbine 164. The turbine 164 converts the high speed, high temperature, gas into a rotational power which drives rotation of the output shaft 168. The output shaft 168 is connected to the propulsor 170. In the alternative examples utilizing two fuel types, fuel in the first fuel storage tank 150 and an oxidizer in a second tank is mixed in the combustor 162 and combusted. The control electronics 130 control the operations of the turbine engine 160, as well as any directional controls, or other electronic systems onboard the unmanned underwater vehicle 100. Further, alternative examples utilizing alternative turbine configurations from the described and illustrated partial admission axial turbine 164 can be utilized FIG. 3 illustrates an exemplary propulsion power vs. speed curve 300 of the exemplary unmanned underwater vehicle 100. As can be seen, the curve 300 is non-linear, and the amount of propulsion power (axis 310) required to increase the speed of the unmanned underwater vehicle (axis 320) by a given amount increases exponentially as the current speed of the unmanned underwater vehicle 100 increases. The specific curve 300 illustrated in FIG. 3 is purely exemplary in nature and does not include actual unmanned underwater vehicle propulsion power or speed values. During operation the propulsion power of an unmanned underwater vehicle is related to the unmanned underwater vehicle's forward speed. In order for an unmanned underwater vehicle to operate properly at a very high sprint speed (i.e. with a high maximum velocity), the gas turbine engine 160 has to be capable of providing a very large power level. In order to achieve the exponentially higher power output required for an unmanned underwater vehicle at sprint speed exponentially more fuel must be expended.

Due to the specific power requirements of the unmanned underwater vehicle 100, operation of the unmanned underwater vehicle 100 at slower speeds can increase the range of the unmanned underwater vehicle 100, by requiring less of the fuel to be expended to cover the same distance. Certain combustion engines powered by liquid fuels, such as Otto Fuel, are very efficient at their maximum power design point, allowing for high speed operation, however their efficiency degrades at lower power levels resulting in less fuel saved by operating at low speed than if the combustion engine could maintain a high efficiency while operating at low power. This phenomenon yields a reduction in underwater vehicle range.

With reference again to FIG. 2, the size of the supersonic nozzle 166 is optimized to provide an optimum turbine blade velocity to gas velocity (U/C) ratio while the gas powered turbine engine 160 is operating at the highest power setting. When the power setting is reduced, such as when the engine is operating to extend the range of the torpedo, the pressure in the combustor 162 is reduced by reducing the flow of fuel from the fuel storage tank 150 to the combustor 162. In one example, this is achieved by reducing the pressure of a fuel pump connecting the fuel storage tank 150 to the combustor 162. The reduced pressure in the combustor 162 lowers the velocity of the combustion products approaching the turbine blades. The mismatch in velocity between the turbine blades and the gas velocity causes increased entrance losses into the turbine, and reduces the efficiency of the turbine engine 160.

With continued reference to FIGS. 1-3, FIG. 4 illustrates an alternate gas powered turbine 400 including three parallel combustors 410A, 410B, 410C. Each of the combustors 410A, 410B, 410C is connected to the turbine section 464 via a corresponding nozzle 466. Each of the combustors 410A, 410B, 410C is approximately identical in size 412, and receives fuel through a fuel inlet 420.

In the example gas powered turbine engine 400, each of the multiple combustors 410A, 410B, 410C and the corresponding nozzles 466 are sized to provide an optimum U/C ratio for a low power mode of operations. In the example utilizing three parallel combustors 410A, 410B, 410C, the low power mode of operations is approximately ⅓ the maximum power mode of operations. In the example, the propulsion system can operate in three modes of operation: a low power mode, a medium power mode, and a high power mode. At low power, fuel is provided to only one of the three combustors 410A, 410B, 410C and the propulsion system operates at ⅓ of the maximum possible power.

As the engine power level is increased above ⅓ maximum power, the engine controller causes a fuel control valve to open, allowing fuel to enter a second combustor 410A, 410B, 410C through the corresponding inlet 420. The two combustor mode is referred to as a medium power level mode of operations and can provide up to ⅔ of the maximum power. As the engine power level is increased above ⅔ maximum power, the engine controller causes another fuel control valve to open, allowing fuel to enter a third combustor 410A, 410B, 410C through the corresponding inlet 420.

The operation of combustors 410A, 410B, 410C in the above described manner to provide an additive power is referred to herein as sequential operation, and the combustors 410A, 410B, 410C are sequentially sized. While described herein as identical combustors 412, the sequential operation, and sequential sizing, of the combustors 410A, 410B, 410C does not necessitate identical sizing of the combustors 410A, 410B, 410C.

Figure 5:
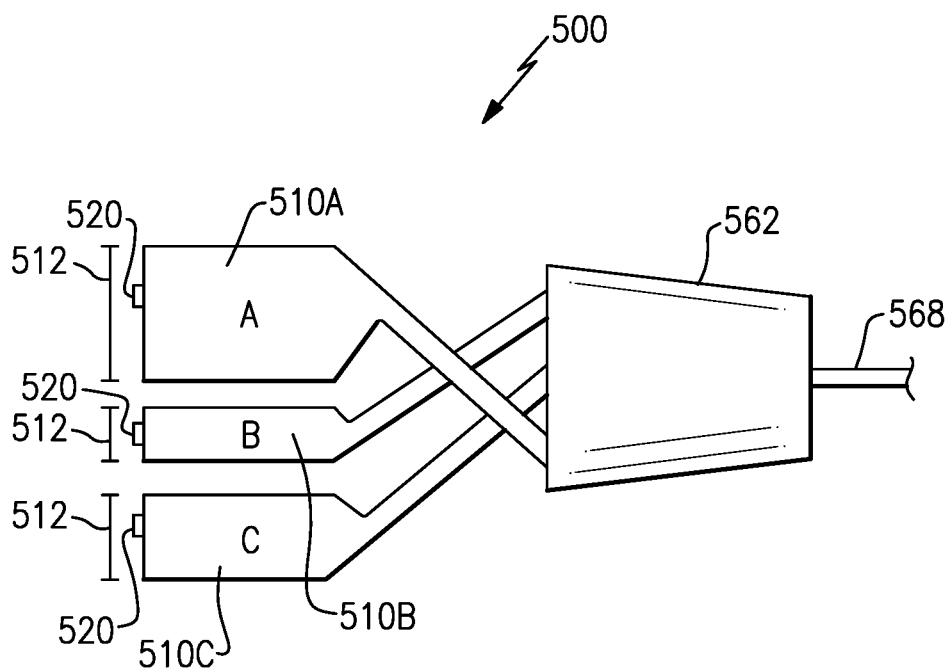
FIG. 5 schematically illustrates an alternate exemplary gas powered turbine for utilization in the torpedo of FIG. 1.

FIG. 5 schematically illustrates an alternative configuration of a gas powered propulsion system 500 for unmanned underwater vehicles including three parallel combustors 510A, 510B, 510C. Each of the combustors 510A, 510B, 510C is connected to the turbine section 564 via a corresponding nozzle 566. Each of the combustors 510A, 510B, 510C has a distinct size 512, and receives fuel through a fuel inlet 520.

In the example gas powered turbine engine 500, each of the multiple combustors 510A, 510B, 510C and the corresponding nozzles 566 are sized to provide an optimum U/C ratio for a corresponding mode of operations. By way of example, the middle illustrated combustor 510B is the smallest combustor 510A, 510B, 510C and is sized for operating at a lowest power mode of operations. The bottom illustrated combustor 510C is an intermediate size, and is sized for operating at an intermediate mode of operations, and the top illustrated combustor 510A is the largest combustor 510A, 510B, 510C and is sized to operate at a highest power mode of operations. In other words, each of the combustors 510A, 510B, 510C is sized to provide the full amount of power required at the corresponding mode of operations. This configuration is referred to as each combustor 510A, 510B, 510C being individually sized for a corresponding mode of operations.

In the example of FIG. 5, the propulsion system 500 can operate in three modes of operation: a low power mode, a medium power mode, and a high power mode. At low power, fuel is provided to smallest combustor 510B, through the fuel inlet 520, and the turbine 562 operates at a corresponding speed. As the propulsion system 500 transitions to a speed that exceeds the available speed from the lowest power combustor 510B, fuel to the smallest combustor 510B is cut off, and provided to the intermediate sized combustor 510C instead. Similarly, once the power requirements of the gas turbine engine exceed the power output of the intermediate sized combustor 510C, fuel to the intermediate combustor 510C is removed, and fuel is provided to the largest combustor 510A.

The propulsion system 500 of FIG. 5 can be further adapted to provide an even higher operational speed by providing fuel to all the combustors 510A, 510B, 510C and operating the combustors 510A, 510B, 510C simultaneously.

Figure 4:
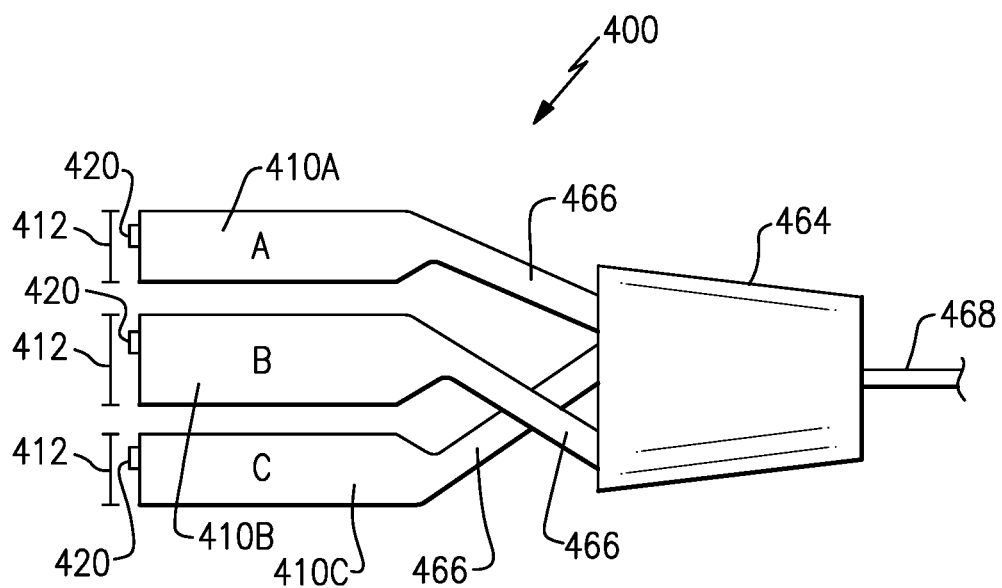
FIG. 4 schematically illustrates an alternate exemplary gas powered turbine for utilization in the torpedo of FIG. 1.

With reference to both FIG. 4 and FIG. 5, the size dimension is indicated at a diameter 412, 512 of the combustor 410A, 410B, 410C, 510A, 510B, 510C. However, one of skill in the art having the benefit of this disclosure, will understand that the size dimension can be any alternative dimension, or combination of dimensions, include length, volume, and circumference.

Further, in each of the examples 400, 500, the nozzles 466, 566 can be distributed evenly circumferentially about an inlet to the turbine 464, 564. In alternative examples, an unevenly spaced distribution can be utilized to better balance flow inlet between unevenly sized combustors.

By utilizing parallel combustors, the low power efficiency of the propulsion system 400, 500 can be increased without negatively impacting the efficiency of the turbine operations at higher powers. The increased efficiencies at low power, increase the range of the torpedo, while still maintaining the high sprint speed capability of the torpedo.

While illustrated herein as including three parallel combustors, it should be appreciated that two, four, or any other number of combustors can be utilized, depending on the number of operational modes the gas powered turbine will be operating in. Further, it should be appreciated that while illustrated in FIG. 4 as including approximately identical combustors, the parallel combustors can be created having distinct sizes, with the size of any given combustor corresponding to an optimum U/C ratio for a corresponding mode of gas powered turbine operation.

Further, while described above within the specific context of a torpedo, one of skill in the art will understand that the propulsion system can be utilized in any similar unmanned underwater vehicle and is not limited to torpedo propulsion systems.

It is further understood that the operating pressure of each combustor in any of the above examples could be varied to provide variable power within each of the power settings (i.e. variable power output capability can be achieved by varying the combustor pressure while utilizing the low power combustor, variable power output capability by varying the combustor pressure while utilizing the medium power combustor, or variable power output capability by varying the combustor pressure while utilizing the high power combustor, etc.)

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propulsion system for an unmanned underwater vehicle comprising:
   at least one fuel storage tank;
   a plurality of combustors connected to the at least one fuel storage tank;
   each of the combustors being connected to a turbine via a corresponding nozzle; and
   an output shaft connected to the turbine and configured to output rotational energy.

2. The propulsion system of claim 1, further comprising a propulsor connected to the output shaft via a geared connection.

3. The propulsion system of claim 1, wherein each combustor in the plurality of combustors is the same size as each other combustor in the plurality of combustors.

4. The propulsion system of claim 1, wherein at least one combustor in the plurality of combustors is larger than each other combustor in the plurality of combustors.

5. The propulsion system of claim 1, further comprising a controller controllably coupled to each combustor in said plurality of combustors and configured to control a flow of fuel from the at least one fuel storage tank to each combustor.

6. The propulsion system of claim 5, wherein the controller is a dedicated propulsion system controller.

7. The propulsion system of claim 5, wherein the controller is a general systems controller.

8. A propulsion system for an unmanned underwater vehicle comprising:
- at least one fuel storage tank;
- a plurality of combustors connected to the at least one fuel storage tank;
- each of the combustors being connected to a partial admission axial flow turbine via a corresponding nozzle; and
- an output shaft connected to the turbine and configured to output rotational energy.

9. The propulsion system of claim 1, wherein the nozzles are distributed evenly about a circumference of a turbine inlet.

10. The propulsion system of claim 1, wherein each of said combustors is individually sized to a corresponding propulsion system operational mode.

11. The propulsion system of claim 1, wherein each of said combustors is sequentially sized to at least one corresponding propulsion system operational mode.

12. The propulsion system of claim 1, wherein the propulsion system is disposed in a torpedo.

13. An unmanned underwater vehicle comprising:
- a body housing at least a first fuel storage tank, a general controller, and a propulsion system; and
- the propulsion system including a gas powered turbine engine mechanically connected to a propulsor, wherein the gas powered turbine engine includes a plurality of parallel combustors.

14. The unmanned underwater vehicle of claim 13, further comprising a second fuel storage tank.

15. The unmanned underwater vehicle of claim 13, wherein the plurality of parallel combustors are sequentially sized.

16. The unmanned underwater vehicle of claim 13, wherein the plurality of parallel combustors are individually sized.

17. An unmanned underwater vehicle comprising:
- a body housing at least a first fuel storage tank, a general controller, and a propulsion system; and
- the propulsion system including a gas powered turbine engine mechanically connected to a propulsor, wherein the gas powered turbine engine includes a plurality of parallel combustors, and each combustor in the plurality of parallel combustors is connected to a single turbine via one of a plurality of supersonic nozzles.

18. The unmanned underwater vehicle of claim 17, wherein the supersonic nozzles are distributed evenly about a first end of the turbine.

19. The unmanned underwater vehicle of claim 13, wherein a mechanical connection between the gas powered turbine engine and the propulsor includes an output stage and a geared connection.

20. A method of driving a propulsion system for an unmanned underwater vehicle, comprising:
- generating combustion products in a single combustor and expanding the combustion products across a turbine in a first propulsion mode; and
- generating combustion products in at least two combustors and simultaneously expanding the combustion products across the turbine in a second propulsion mode.

* * * * *